Aug. 22, 1967 D. T. ACHESON 3,337,175
TIE DOWN CLAMP
Filed Sept. 28, 1965
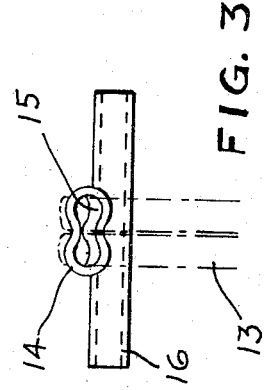
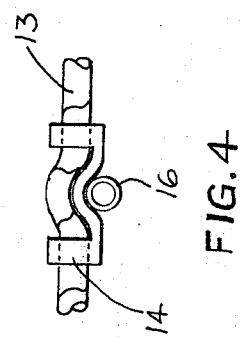
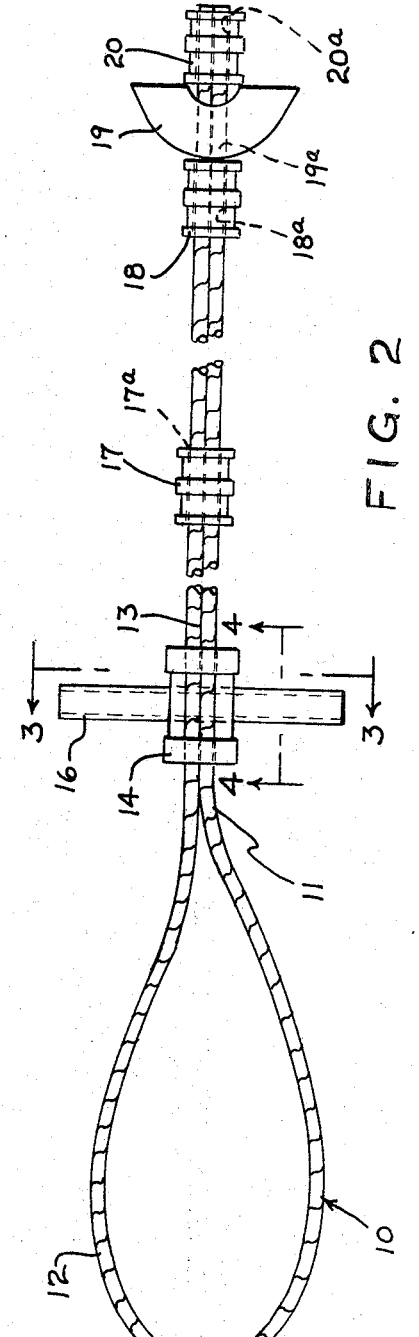
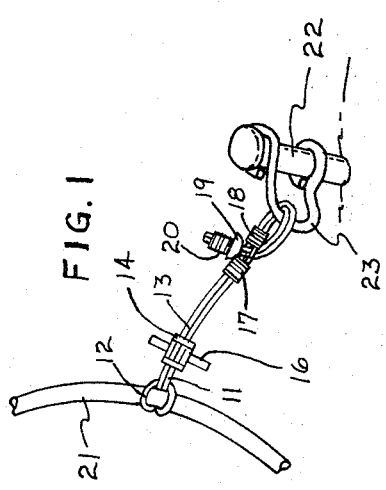
INVENTOR
DONALD T. ACHESON
BY Harry M. Saragovitz,
Edward J. Kelly,
& A. J. Dupont ATTORNEYS 3,337,175
TIE DOWN CLAMP
Donald T. Acheson, Silver Spring, Md., assignor to the United States of America as represented by the Secretary of the Army
Filed Sept. 28, 1965, Ser. No. 491,061
5 Claims. (Cl. 248—361)

ABSTRACT OF THE DISCLOSURE

A tie down clamp for a high pressure hose having a double cord. One end of the cord is looped over the hose while the free end is threaded through an anchor and is passed back through the double cord. Two clamps on the cord together with a washer and a clamp and the free end of the cord cooperate to hold the free end in a locked position.

My clamp is secured to a high pressure hose by looping its doubled cord over same and tightening and securing the cord by slidable lock means. The free end of the cord is secured to an anchor.

The invention described herein may be manufactured and used by or for the Government for governmental purposes, without the payment to me of any royalty thereon.

My invention relates to a tie down clamp, and more particularly to a tie down clamp for high pressure air hoses.

When a high pressure air hose is severed or ruptured, the hose whips back and forth thereby presenting a real danger of injuring adjacent personnel and/or equipment.

It is therefore a primary object of my invention to provide a tie down which will restrain the movement of high pressure hoses after failure thereby preventing possible injury to personnel and equipment.

Another object of my invention is to provide a tie down clamp which can be readily secured at one end to a hose or the like and at the other end to an anchoring member.

Other objects and advantages of my invention will be apparent during the course of the following description.

In the accompanying drawing, forming a part of this application, and in which like numerals are employed to designate like parts throughout the same:

FIGURE 1 is a perspective view of my invention showing the clamp secured to a cable and an anchoring post;
FIGURE 2 is a top plan view of the clamp;
FIGURE 3 is a sectional view taken substantially on the line 3—3 of FIGURE 2; and
FIGURE 4 is a sectional view taken substantially on the line 4—4 of FIGURE 2.

In the drawing wherein for the purpose of illustration is shown a preferred embodiment of my invention, the numeral 10 indicates the tie down clamp generally which comprises a cord 11, preferably of steel, that is doubled to provide a loop 12 and a doubled trailing cord designated 13. A sliding fastener 14 having a centrally pinched oval cord receiving channel 15 therethrough is positioned on the trailing cord 13 adjacent the loop 12. A tube 16, preferably of steel, is secured to one side of the sliding fastener 14 by any suitable means and extends substantially above and below the top and bottom portion of the sliding fastener 14. Two oval sleeve fasteners 17 and 18 having channels 17a and 18a therethrough are placed on the trailing cord 13 a substantial distance apart. A concaved washer 19, preferably of steel, has an opening 19a therethrough and is positioned on the trailing cord 13 adjacent the fastener 18. A third oval sleeve fastener 20 having a channel 20a therethrough is secured to the end of the trailing cord 13. The oval sleeve fastener 18 is secured by crimping to the trailing cord 13. The oval sleeve fastener may be secured by crimping to the trailing cord 13 at a distance from oval sleeve 18 sufficient to allow the passage of washer 19 between the portion of the doubled cable of trailing cord 13 located between oval sleeves 17 and 18. Alternately, the oval sleeve fastener 17 may be left free to travel on the trailing cord 13.

In operation, the loop 12 is passed under the hose 21 to be anchored and the trailing cord 13 is passed through the end of the loop 12 to hold the hose 21. The sliding fastener 14 is moved along the trailing cord 13 by pulling the tube 16 to a position adjacent the hose 21. The end of the trailing cable 13 is passed through a D-ring 23 or the like carried by a post or anchoring member 22. The end of the trailing cable 13 is then passed through the doubled cable between the fasteners 17 and 18. If the alternate configuration, described above in which the fastener 17 is left free, be chosen, the oval sleeve fastener 17 is moved toward fixed oval sleeve fastener 18 to hold the washer 19 in position between the doubled trailing cord B.

It is to be understood that the form of the invention herewith shown and described is to be taken as a preferred embodiment of same, and that various changes in the shape, size, and arrangement of parts may be resorted to without departing from the spirit of my invention or the scope of the subjoined claims.

I claim:
1. A tie down clamp for an air pressure hose or the like comprising a doubled cord providing a loop at one end and a doubled strand trailing portion, slidable lock means movable on said trailing portion to a position adjacent said hose engaging loop, enlarged stop means positioned adjacent the end of said trailing portion, the end of said trailing portion and said stop means circling an anchor and positioned between said double strand trailing portion and lock means positioned on said trailing portion securing said stop means between said double strand trailing portion between said double strand trailing portion.

2. The structure of claim 1, wherein said slidable lock means comprises a sliding fastener having a centrally located pinched oval shaped cord receiving channel therethrough.

3. A tie down clamp for an air pressure hose or the like comprising a doubled cord providing a loop at one end and a doubled strand trailing portion, a sleeve fastener carried by said trailing portion secured at the end thereof, enlarged stop means positioned adjacent said sleeve fastener, slidable lock means movable on said trailing portion to a position adjacent said hose engaging loop, second and third sleeve fasteners carried by said trailing portion between said sliding lock means and said first mentioned sleeve fastener, the end of said trailing portion including said enlarged stop means circling an anchor and positioned between said double strand trailing portion and between said second and third sleeve fasteners, and said second and third sleeve fasteners being movable towards each other to clamp the end of said trailing portion with said enlarged stop means and said first sleeve fastener between the strands of said trailing portion.

4. The structure of claim 3, wherein said slidable lock means comprises a sliding fastener having a pinched oval shaped cord receiving channel therethrough.

5. The structure of claim 4, wherein said sliding fastener has a finger engaging tube member secured thereto.

References Cited

UNITED STATES PATENTS

| 535,319 | 3/1895 | Cole | 119—123 |
| 606,400 | 6/1898 | Whitner | 182—4 |
| 1,879,991 | 9/1932 | Pratt | 119—109 X |
| 2,522,719 | 9/1950 | Johnson | 119—109 X |
| 3,266,464 | 8/1966 | Davis | 119—109 X |

CHANCELLOR E. HARRIS, *Primary Examiner.*